US011215447B2

(12) United States Patent
Nawrot et al.

(10) Patent No.: US 11,215,447 B2
(45) Date of Patent: Jan. 4, 2022

(54) MECHANICAL STRAIN AMPLIFYING TRANSDUCER

(71) Applicant: VRIJE UNIVERSITEIT BRUSSEL, Brussels (BE)

(72) Inventors: Urszula Nawrot, Sycow (PL); Thomas Geernaert, Buggenhout (BE); Francis Berghmans, Westerlo (BE); Hugo Thienpont, Gooik (BE)

(73) Assignee: VRIJE UNIVERSITEIT BRUSSEL, Brussels (BE)

( * ) Notice: Subject to any disclaimer, the term of this patent is extended or adjusted under 35 U.S.C. 154(b) by 287 days.

(21) Appl. No.: 16/342,684

(22) PCT Filed: Oct. 23, 2017

(86) PCT No.: PCT/EP2017/077039
§ 371 (c)(1),
(2) Date: Apr. 17, 2019

(87) PCT Pub. No.: WO2018/073458
PCT Pub. Date: Apr. 26, 2018

(65) Prior Publication Data
US 2020/0064122 A1 Feb. 27, 2020

(30) Foreign Application Priority Data
Oct. 23, 2016 (EP) .................. 16195193

(51) Int. Cl.
*G01B 11/16* (2006.01)
*G01N 3/06* (2006.01)
(Continued)

(52) U.S. Cl.
CPC ............... *G01B 11/18* (2013.01); *G01B 5/30* (2013.01); *G01B 7/16* (2013.01); *G01B 21/32* (2013.01);
(Continued)

(58) Field of Classification Search
CPC . G01B 11/18; G01B 5/30; G01B 7/16; G01B 21/32; G01L 1/06; G01L 1/246; G01N 3/06
See application file for complete search history.

(56) References Cited

U.S. PATENT DOCUMENTS 3,263,496 A * 8/1966 Fathauer ................ G01L 1/14
73/862.626
3,899,922 A * 8/1975 Mercer, Jr. ........... G01B 7/16
73/782

(Continued)

FOREIGN PATENT DOCUMENTS

| CN | 102252598 A | 11/2011 |
| FR | 2554591 A2 | 5/1985 |
| WO | 2011026616 A1 | 3/2011 |

OTHER PUBLICATIONS

He et al., "Study on a New Kind of Surface Sticking Strain Sensor with Sensitivity Enhanced Based on FBG," Proceedings of Society of Photo-Optical Instrumentation Engineers, vol. 6595, 2007, 10 Pages.

(Continued)

*Primary Examiner* — Nathaniel T Woodward
*Assistant Examiner* — Philip L Cotey
(74) *Attorney, Agent, or Firm* — Workman Nydegger

(57) ABSTRACT

A transducer for assisting in measuring displacement or strain in an object of interest is described. A plate has at least two end sections for mounting the transducer. It comprises a flexible connection between the two end sections. The flexible connection comprises a plurality of rigid portions and flexible interconnections between the rigid portions for allowing relative movement of the rigid portions with respect to each other. The flexible connection has a central section substantially having a U-shape comprising two rigid portions spaced from each other over a distance and adapted (Continued)

for positioning a strain sensing element at the spacing in between said two rigid portions. The rigid portions and flexible interconnections are arranged so that a displacement applied to the end sections results in a relative displacement at the spacing in the central section that is larger than the relative displacement applied to the end sections.

18 Claims, 12 Drawing Sheets

(51) Int. Cl.
*G01B 5/30* (2006.01)
*G01B 7/16* (2006.01)
*G01B 21/32* (2006.01)
*G01L 1/06* (2006.01)
*G01L 1/24* (2006.01)

(52) U.S. Cl.
CPC ............... *G01L 1/06* (2013.01); *G01L 1/246* (2013.01); *G01N 3/06* (2013.01)

(56) References Cited

U.S. PATENT DOCUMENTS

| | | | | |
|---|---|---|---|---|
| 4,751,382 A * | 6/1988 | Reifel | ............... | G01D 5/26 250/231.1 |
| 6,834,552 B1 | 12/2004 | Thorsen | | |
| 7,068,869 B1 * | 6/2006 | Araujo | ............... | G01L 1/246 385/13 |
| 7,134,219 B2 * | 11/2006 | Wood | ............... | G01D 5/35303 33/613 |
| 9,739,673 B2 * | 8/2017 | LeGendre | ............... | G01B 7/18 |
| 2007/0180930 A1 * | 8/2007 | Menke | ............... | G01G 19/4142 73/862 |
| 2007/0193362 A1 * | 8/2007 | Ferguson | ............... | G01B 11/18 73/800 |
| 2008/0052014 A1 * | 2/2008 | Toyosada | ............... | G01N 3/32 702/34 |
| 2008/0184580 A1 * | 8/2008 | Secq | ............... | G01N 3/08 33/555 |
| 2009/0178488 A1 * | 7/2009 | Kuzdrall | ............... | G01B 11/161 73/849 |
| 2012/0069324 A1 * | 3/2012 | Ansari | ............... | G01M 5/0091 356/32 |
| 2012/0118070 A1 * | 5/2012 | Mol | ............... | G01G 3/14 73/760 |
| 2013/0004116 A1 * | 1/2013 | Ruggiero | ............... | G01L 5/12 385/12 |

OTHER PUBLICATIONS

Li et al., "Design of an Enhanced Sensitivity FBG Strain Sensor and Application in Highway Bridge Engineering," Photonic Sensors, vol. 4, No. 2, 2014, pp. 162-167.

Li et al., "Sensitivity Enhancement of Long-gage FBG Sensors for Macro-strain Measurements," Structural Health Monitoring, vol. 8, No. 6, 2009, pp. 415-423.

Extended European Search Report from EP Application No. 16195193.4, dated Mar. 20, 2017.

International Search Report and Written Opinion from PCT Application No. PCT/EP2017/077039, dated Nov. 28, 2017.

* cited by examiner

MECHANICAL STRAIN AMPLIFYING TRANSDUCER

FIELD OF THE INVENTION

The invention relates to the field of strain measuring, e.g. in structural health monitoring. More particularly, the present invention relates to a mechanical strain-amplifying transducer for use for example with a fiber Bragg grating sensor, systems and methods for measuring strain and the use of such systems for measuring strain.

BACKGROUND OF THE INVENTION

Poor maintenance of buildings and constructions can lead to catastrophic failure. Structural health monitoring helps to optimize maintenance strategies. Structural health monitoring helps in increasing the safety and the lifetime of the structures, it provides a possibility for real time condition assessment.

Structural Health Monitoring (SHM) based on in-situ and real-time monitoring of bridges, buildings, dams, wind turbines, tunnels or other civil engineering structures offers the possibility to readily detect any adverse change in their performance and condition as a result of damage. Non-destructive damage identification methods can be generally categorized either as local or global. Global methods can only determine whether or not damage is present in an entire structure, while local methods require that the vicinity of damage is known a priori and that the damaged area is accessible for testing. Vibration-based damage identification can potentially overcome both challenges: this approach relies on the principle that the modal characteristics of a structure are stiffness dependent. Changes in natural frequencies, damping ratios and modal strains, which are obtained from successive modal tests, can therefore be used as indicators to detect and to identify damage. Although vibration-based damage identification is conceptually very attractive, its application to civil structures under ambient excitation faces two major challenges: the sensitivity of dynamic characteristics to a certain type of damage may be low, and environmental factors such as temperature also influence the dynamic characteristics.

The sensitivity to damage can be improved with dynamic strain measurements, as modal strains or curvatures can be much more sensitive to local damage than most other dynamic characteristics. Whilst strain measurements typically rely on the use of resistive strain gauges, strain sensing systems based on optical fibers have received a continuously increasing popularity for civil structural health monitoring because of their immunity to electromagnetic interference, ability to measure over very long distances, and applicability in harsh environments. Optical sensors based on fiber Bragg grating (FBG) technology have an important additional advantage to offer, i.e. many of such sensors can be wavelength-multiplexed into the same optical fiber.

The typical strain sensitivity of a fiber Bragg grating with an operating wavelength around 1550 nm is 1.2 pm/microstrain (1 microstrain=1 µε=a relative elongation of $10^{-6}$). In combination with commercially available FBG interrogators, the resulting strain resolution is typically in the order of 0.8 microstrain. This compromises direct in-situ measurements of dynamic strains on a civil engineering structure caused by ambient excitation such as wind or traffic, because the resulting strain amplitudes can be much lower and require strain sensor sensitivities of the order of 0.1 microstrain, or even better. Whereas there are many commercially available sensors that can measure strain on a structure (for example electrical strain gauges or fiber Bragg grating-based sensors), in practice only a handful of these allow measuring strain levels below 0.8 microstrain. A commercially available long gauge FBG strain sensor is known having a strain resolution of 0.4 µε.

For some applications nevertheless, for example when measuring the strain in a large concrete structure such as a bridge, the target resolution for the strain sensitivity is at least an order of magnitude higher (12 pm/µε) because one wants to be able to measure (dynamic) strain in the structure with amplitudes below 0.08 µε.

One possibility to reach better strain sensitivity is to use a FBG interrogator with a higher Bragg wavelength resolution. Nevertheless, such devices typically cost a tenfold more than standard interrogators.

Existing approaches in the literature for mechanical strain amplification of FBG sensors, mostly rely on long-gauge packages via a reduced cross-section of the package. They typically do so via the combination of materials with different Young's modulus.

Jun He et al. Reported in "Study on a new kind of surface sticking strain sensor with sensitivity enhanced based on FBG", Proc. SPIE, vol. 6595 (2007) on a surface sticking strain sensor package with enhanced sensitivity. Strain was increased by the reduction of the cross-section at the location of the FBG, reaching a strain amplification 1.63.

Suzhen Li et al reported in "Sensitivity Enhancement of Long-gage FBG Sensors for Macro-strain Measurements" in Structural Health Monitoring, vol. 8 no. 6, (2009) pp 415-423 the use of two materials of different stiffness to package an FBG in a tube and transfer the deformation applied to the tube on the short-gage part with the FBG. This approach was demonstrated adopting two recoating materials tailored to a suitable length. The highest strain amplification of 4.4 was obtained for package measuring 600 mm in length where the part with the FBG measured 120 mm.

In 2014, Litong Li et al. developed an enhanced sensitivity FBG strain sensor with a cylindrical shell encapsulation, as described in "Design of an Enhanced Sensitivity FBG Strain Sensor and Application in Highway Bridge Engineering" Photonic Sensors. The strain sensor, which consists of three tubular structures, improves strain sensitivity through an uneven area of the cross-section in the zone of the strain concentration. The strain amplification of this sensor is equal to 2.3.

Consequently, there is still a need for more sensitive measurement systems.

SUMMARY OF THE INVENTION

It is an object of the present invention to provide systems and methods for measuring strain with high strain sensitivity, e.g. with a sensitivity of at least 0.2 µε or smaller, for example at least 0.1 µε or smaller, advantageously at least 0.08 µε or smaller.

It is an advantage of embodiments of the present invention that a dedicated transducer is provided allowing to measure a strain level that is 10 to 100 times higher than the strain applied to the transducer itself and which on its turn corresponds to the strain in the structure on which the transducer is mounted. According to embodiments of the present invention, the transducer can be used with a Fibre Bragg Grating sensor that is surface-mounted on the transducer.

In some embodiments, the transducers may be calibrated for use.

In some embodiments, a pre-strain may be applied during installation for lowering the minimal strain in compression that can be measured.

It is an advantage of embodiments of the present invention that a very sensitive strain sensor can be obtained, whereby a high value of strain amplification can be obtained using the system.

It is an advantage of embodiments of the present invention that the degree of strain amplification can be tuned to the application.

It is an advantage of embodiments of the present invention, that the transducer can be manufactured at low cost. Manufacturing can for example be performed using laser cutting.

It is an advantage of embodiments of the present invention that the transducer can be easily installed and replaced without advance knowledge on dealing with the optical fibers.

It is an advantage of embodiments of the present invention that the strain amplification can be high for relatively small dimensions of the transducer.

It is an advantage of embodiments of the present invention that the system for measuring strain can be based on optical fiber sensors. It is an advantage of such systems that these can be small in size, lightweight and low in cost. It can be applied for static and dynamic applications. The solution according to embodiments of the present invention provides environmental ruggedness, is immune to electromagnetic interference, allow for high precision over the full lifetime. Embodiments of the present invention also provide the ability for using multiplexed sensors using a single fiber. Additionally, the solution according to embodiments of the present invention also allows for a short installation time.

It is an advantage of embodiments according to the present invention that non-destructive measurements can be performed. It allows for measuring dynamic strain caused by ambient excitation. It is an advantage of embodiments according to the present invention that it may serve identification of the invisible damage at the surface. It is an advantage of embodiments of the present invention that it allows for detection with a sensitivity to local damages.

The object is obtained by a device and system according to the present invention.

The present invention relates to a transducer for assisting in measuring displacement or strain in an object of interest, the transducer being a plate having at least two end sections for mounting the transducer to the object of interest, the transducer comprising a flexible connection between the two end sections, the flexible connection comprising a plurality of rigid portions and flexible interconnections between the rigid portions for allowing relative movement of the rigid portions with respect to each other, the flexible connection having a central section being substantially U-shaped comprising two rigid portions spaced from each other over a distance and adapted for positioning a strain sensing element at the spacing in between said two rigid portions, the central section being connected to the remainder of the flexible connection via flexible interconnections, wherein the rigid portions and flexible interconnections are arranged so that a displacement applied to the end sections results in a relative displacement at the spacing in the central section that is larger than the relative displacement applied to the end sections. The transducer may be configured for inducing a strain amplification in a same direction as a direction wherein a force is applied to the transducer.

The plurality of rigid portions and flexible interconnections may form more than 1 lever.

The central section may be substantially U-shaped, the central section being connected to the remainder of the flexible connection via flexible interconnections at a position on the rigid portions away from the spacing adapted for positioning a strain sensing element.

The central section may be connected to the remainder of the flexible connection via flexible interconnections at a position on the rigid portions away from a top side of the substantial U-shape being the opening of the U-shape.

The central section may be connected to the remainder of the flexible connection via flexible interconnections at a position on the rigid portions away from a bottom side of the substantial U-shape.

The transducer plate may be made of a single material. The single material may for example be a metal (e.g. Aluminum, stainless steel), or a polymer (PMMA, PC), or a composite material. The latter provides for example the advantage of ease of manufacturing.

The plate may have a uniform thickness.

The distance between the mounting points to the spacing between the spaced rigid portions of the central section may have a ratio of at least 2.

The plate may have a single symmetry axis or has two symmetry axes.

The distance between the mounting points may be at least 5 cm, preferably between 15 cm-100 cm.

The eigenfrequencies of the structure may be above 50 Hz.

The thickness of the structure may be between 1-10 mm.

The spring constant of the plate may be below $10^7$ N/m, preferably below $10^6$ N/m.

Grooves may be provided on the surface of the plate to mount the strain element at the central section. The transducer further may comprise at least one rigid connection between the two end sections.

The present invention also relates to a system for measuring displacement or strain in an object of interest, the system comprising a transducer as described above and a strain element connected to the central section and provided with a strain sensor for measuring strain in the central section.

The strain experienced by the strain sensor may be amplified by the transducer with respect to the strain applied to the end sections of the plate, whereby the strain amplification is larger than 5.

The strain element may be mounted under pre-strain and/or the strain element may comprise one or more of an optical fiber, a strain gauge or a fiber Bragg grating.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
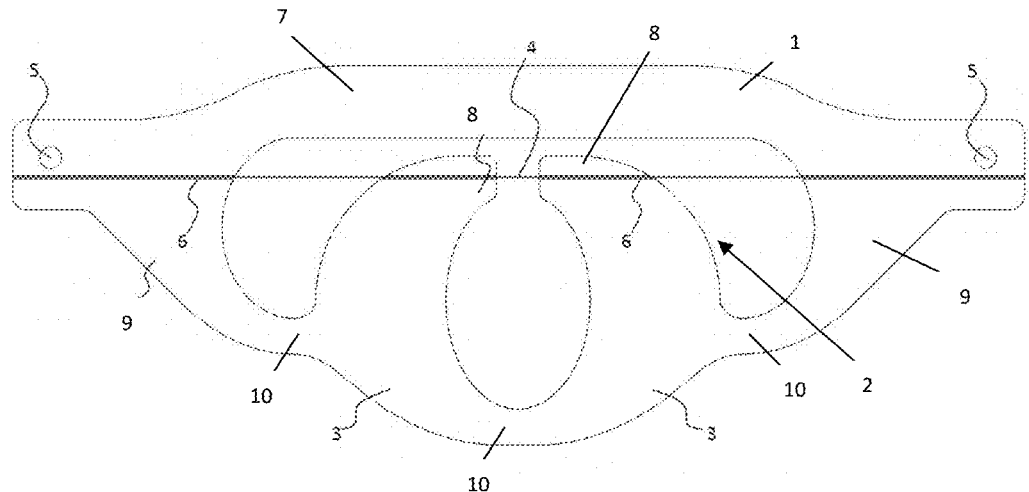
FIG. 1 illustrates a first example of a transducer according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

DETAILED DESCRIPTION OF EMBODIMENTS OF THE PRESENT INVENTION

Although the present invention will hereinafter be described with respect to particular embodiments and with reference to certain drawings, the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms 'first', 'second' and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, above, front and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term 'including', used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression 'a device including means A and B' should not be limited to devices consisting only of components A and B. It means that with respect to the present invention, the only relevant components of the device are A and B.

Reference throughout this specification to 'one embodiment' or 'an embodiment' means that a particular feature, structure or characteristic described in connection with the embodiment is included in at least one embodiment of the present invention. Thus, the appearance of the phrases 'in one embodiment' or 'in an embodiment' in various places throughout this specification do not necessarily all refer to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of illustrative embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be rendered into practice without these specific details. In other instances, well-known methods, structures and techniques have not been shown in detail in order not to obscure an understanding of this description.

In a first aspect, the present invention relates to a transducer for assisting in measuring displacement or strain in an object of interest. The object of interest may be any type of object that may be subject to strain, such as for example building constructions, towers, bridges but also windmills, planes, pipelines, etc. The transducer may be especially useful for structural health monitoring, although embodiments are not limited thereto. According to embodiments of the present invention, the transducer being a plate having at least two end sections adapted for mounting the transducer to the object of interest. The end sections typically may be positioned such that the transducer is fixed over the area of the object of interest for which the strain is to be measured or analysed. The transducer comprises a flexible connection between the two end sections. Furthermore the flexible connection comprises a plurality of rigid portions and flexible interconnections between the rigid portions for allowing relative movement of the rigid portions with respect to each other. The flexible connection has a central section being substantially U shaped comprising two rigid portions spaced from each other over a distance and adapted for positioning a strain sensing element at the spacing in between said two rigid portions. The central section is connected to the remaining portion of the flexible connection via flexible interconnections.

According to embodiments of the present invention, the rigid portions and flexible interconnections are arranged so that a displacement or strain applied to the end sections results in a relative displacement at the spacing in the central section that is larger than the relative displacement applied to the end sections. The transducer may comprise at least one rigid connection being positioned between the two end sections.

In some embodiments, the flexible interconnections connecting the central portion to the remaining part of the flexible connection are positioned away from the top side of the U shape, i.e. away from the opening of the U shape. In some embodiments, the flexible interconnections connecting the central portion to the remaining part of the flexible connection are positioned away from the bottom side of the U shape. In some embodiments the flexible interconnections are positioned away from the extremities of the U shape and are positioned at an intermediate position along the upstanding legs of the U-shape.

The transducer may be configured for inducing a strain amplification in a same direction as a direction wherein a force is applied to the transducer.

The transducer plate may be made of a single material. The latter provides for example the advantage of ease of manufacturing.

By way of illustration, embodiments of the present invention not being limited thereto, an exemplary embodiment having standard and optional features will be described below, with reference to the drawings.

Figure 2:
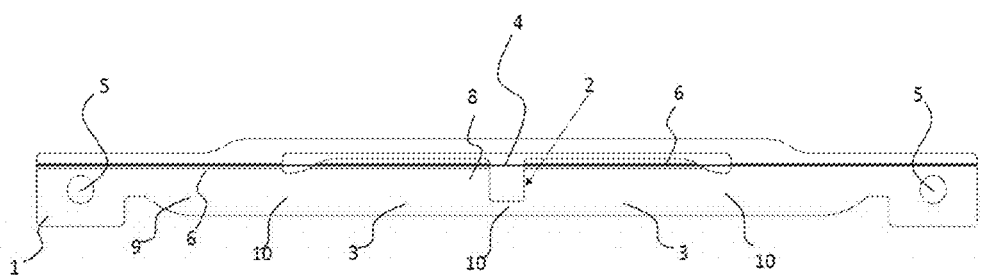
FIG. 2 illustrates a second example of a transducer according to an embodiment of the present invention.

An exemplary transducer is shown in top view in FIG. 1. A second example of a transducer with a different width-to-height ratio is shown in top view in FIG. 2. The transducer is made of a plate 1. The plate may be made of for example but not limited to a metal (Aluminum, stainless steel), or a polymer (PMMA, PC), or a composite material. The plate 1 comprises two end sections 5 for mounting the transducer to the object of interest. The latter may for example be obtained by providing mounting holes in these end sections. The number of mounting holes is not limited to two. Also other ways of fixing the system to the object of interest may be applied. It is important to note that the fixation should be such that the transducer is firmly fixed so that the strain in the object is fully transferred to the transducer. The transducer of FIG. 1 also shows a rigid connection 7 between the two end sections. This rigid connection is not strictly required. Without the rigid connection, the strain amplification also is possible, resulting in a potential beneficial reduction in k-factor (spring constant) and showing no significant reduction in the resonance frequencies. The transducer also comprises a flexible connection between the two end sections 5. The flexible connection comprises a plurality of rigid portions 3, 8, 9 and flexible interconnections 10 between the rigid portions 3, 8, 9 for allowing relative movement of the rigid portions 8, 9 with respect to each other. The flexible connection has a central section 2 comprising two rigid portions 8 spaced from each other over a distance and adapted for positioning a strain sensing element 4 at the spacing in between said two rigid portions 8. The strain sensing element may for example be a fiber Bragg grating (FBG). The grooves 6 may be used for glueing the strain sensing element on the transducer. The rigid portions 3, 8, 9 and flexible interconnections 10 are arranged so that a displacement applied to the end sections 5 results in a relative displacement at the spacing in the central section 2 that is larger than the relative displacement applied to the end sections 5.

Figure 7:
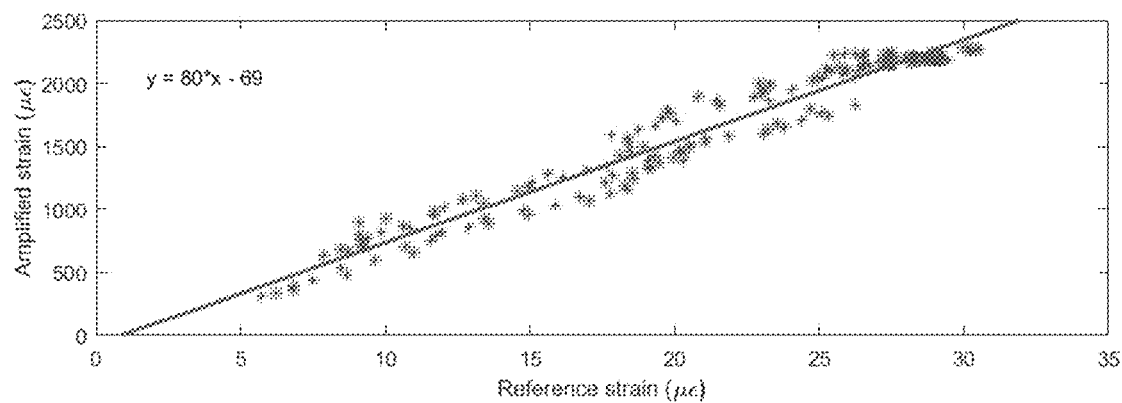
FIG. 7 and FIG. 8 illustrate the correlation between strain measured with a reference fiber Bragg grating and the amplified strain measured for respectively the first example (FIG. 1) and the second example (FIG. 2) of the transducer according to an embodiment of the present invention. These gratings were surface mounted with X120 adhesive from HBM.
Figure 8:
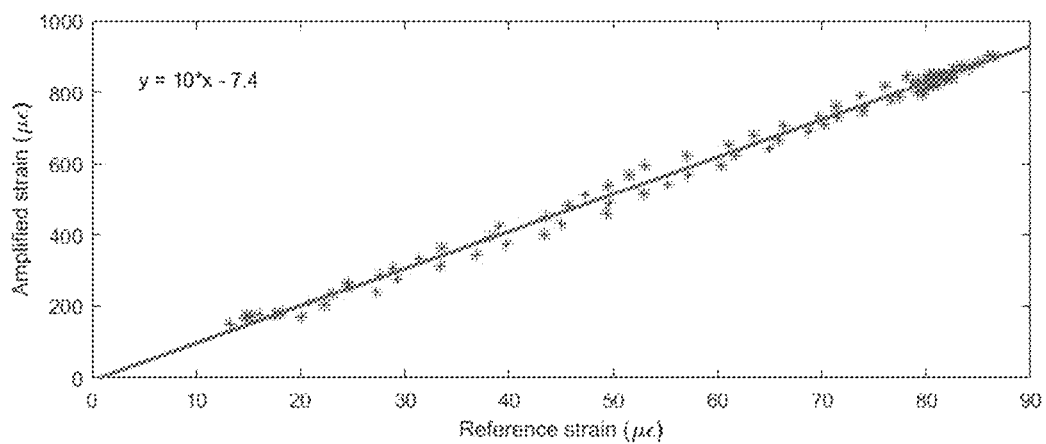
Figure 9:
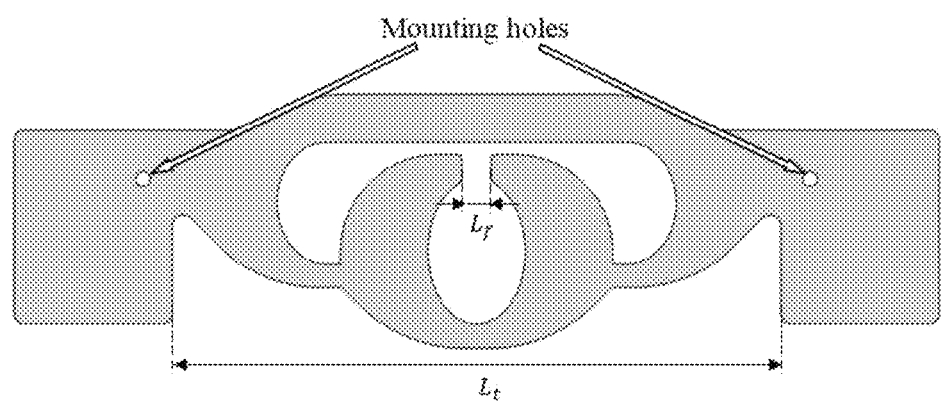
FIG. 9 shows a transducer design with indication of the lengths Lt and Lf that are used to define the strain amplification, illustrating features of embodiments of the present invention.
Figure 10:
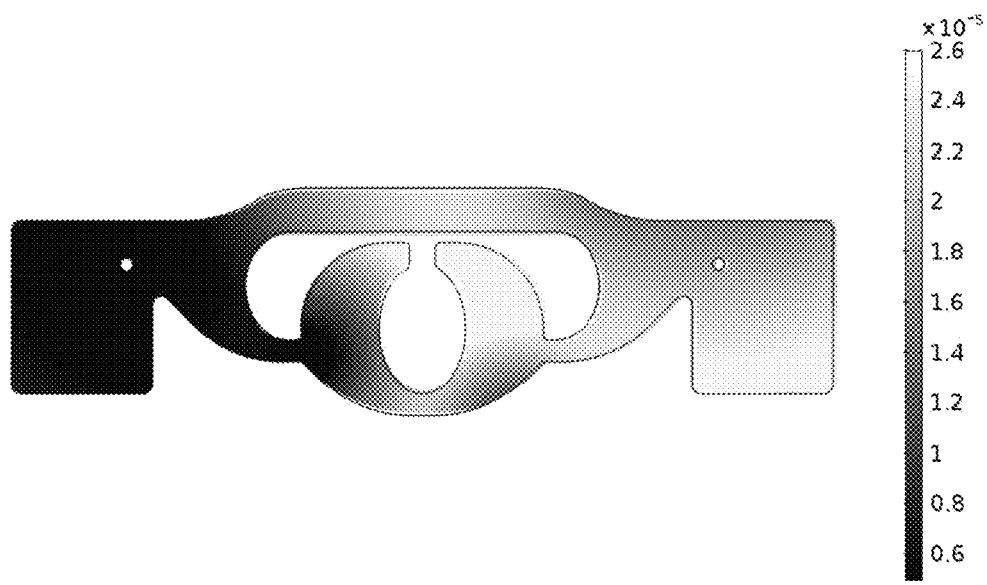
FIG. 10 illustrates a finite element simulation of total displacement when a horizontal tensile fore is applied, as can be obtained using an embodiment of the present invention. The deformation was exaggerated for sake of clarity.

FIG. 7 and FIG. 8 illustrate the correlation between strain measured with a reference fiber Bragg grating and the amplified strain measured for respectively the first example (FIG. 1) and the second example (FIG. 2) of the transducer according to an embodiment of the present invention.

Figure 3:
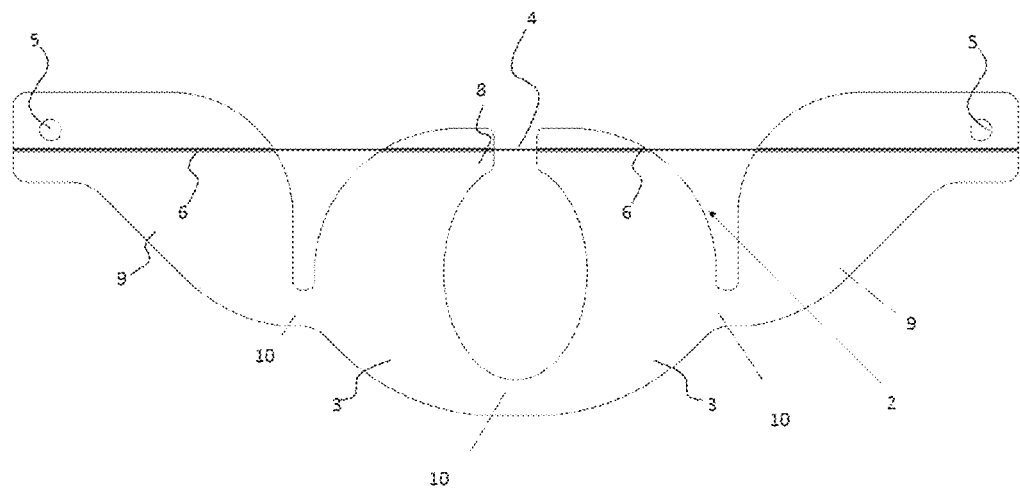
FIG. 3 illustrates an alternative design of a transducer without rigid connection, according to an embodiment of the present invention.
Figure 4:
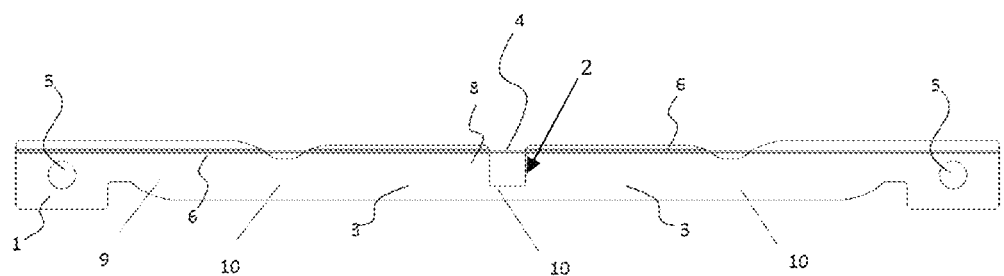
FIG. 4 illustrates a second alternative design of a transducer without rigid connection, according to an embodiment of the present invention.
Figure 5:
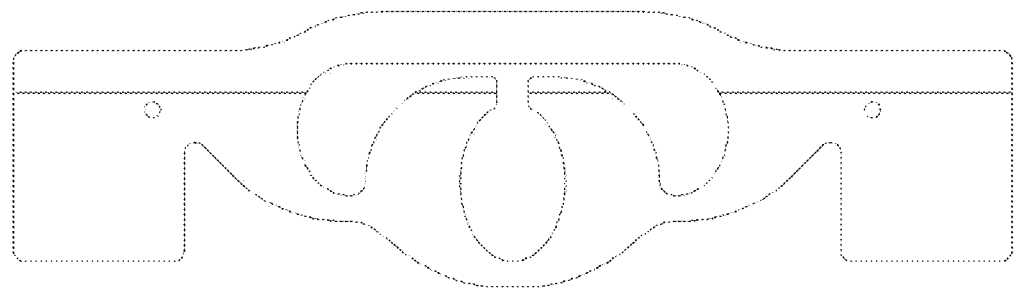
FIG. 5 illustrates an alternative design of a transducer with rigid connection, according to an embodiment of the present invention.
Figure 6:
FIG. 6 illustrates a further alternative design of a transducer with rigid connection, according to an embodiment of the present invention.

In FIG. 3 and FIG. 5 two alternative designs are shown, whereby the transducer shown in FIG. 3 does not comprise a rigid connection 7. In FIG. 4 and FIG. 6 transducers with a shape similar to those respectively shown in FIG. 3 and FIG. 5 are illustrated, but with a smaller height.

By way of illustration, embodiments of the present invention not being limited thereto, the spring constant and eigenfrequencies for the different designs are shown in the tables indicated below.

The properties of the transducer as shown in FIG. 3 are given in table 1

TABLE 1

Simulated properties of transducer shown in FIG. 3

| Thickness (m) | Spring constant (N/m) | Weight (kg) | Eigenfreq. [Hz] |
|---|---|---|---|
| 3 | $4.4 \cdot 10^4$ | 0.18 | 322 |
| 5 | $7.4 \cdot 10^4$ | 0.30 | 243 |
| 7 | $1.0 \cdot 10^5$ | 0.42 | 327 |
| 9 | $1.3 \cdot 10^5$ | 0.54 | 411 |

The properties of the transducer as shown in FIG. 5 are given in table 2

TABLE 2

Simulated properties of transducer shown in FIG. 5

| Thickness (m) | Spring constant (N/m) | Weight (kg) | Eigenfreq. [Hz] |
|---|---|---|---|
| 3 | $2.9 \cdot 10^6$ | 0.19 | 320 |
| 5 | $4.6 \cdot 10^6$ | 0.32 | 244 |
| 7 | $6.3 \cdot 10^6$ | 0.45 | 338 |
| 9 | $8.0 \cdot 10^6$ | 0.58 | 409 |

The properties of the transducer as shown in FIG. 4 are given in table 3

TABLE 3

Simulated properties of transducer shown in FIG. 4

| Thickness (m) | Spring constant (N/m) | Weight (g) | Eigenfreq. [Hz] |
|---|---|---|---|
| 3 | $4.2 \cdot 10^6$ | 18 | 423 |
| 4 | $5.4 \cdot 10^6$ | 24 | 556 |
| 5 | $6.7 \cdot 10^6$ | 30 | 688 |
| 6 | $7.9 \cdot 10^6$ | 36 | 811 |

The properties of the transducer as shown in FIG. 6 are given in table 4

TABLE 4

Simulated properties of transducer shown in FIG. 6

| Thickness (m) | Spring constant (N/m) | Weight (g) | Eigenfreq. [Hz] |
|---|---|---|---|
| 3 | $9.8 \cdot 10^6$ | 22 | 401 |
| 4 | $13.0 \cdot 10^6$ | 29 | 527 |
| 5 | $16.2 \cdot 10^6$ | 36 | 652 |
| 6 | $19.0 \cdot 10^6$ | 43 | 769 |

By way of illustration, embodiments of the present invention not being limited thereto, an example of a study for enabling measurements of very low strain levels using a dedicated mechanical transducer installed between the structure under test and the fiber Bragg grating is described below. The example illustrates that the strain applied to the FBG is much larger than the strain applied to the transducer itself. The design and fabrication of the transducer is first discussed. Thereafter, the results of the experimental calibration are presented.

First the design and fabrication of the strain-amplifying transducer is discussed in detail. FIG. 5 shows the structural model of the strain-amplifying FBG transducer, being an example of an embodiment of the present invention. It features a symmetric double cantilever structure. For concrete structures the gauge length should be sufficiently small to allow for quasi-distributed measurements but also sufficiently long to integrate the spatial strain variations inherent to the inhomogeneous nature of concrete. The size of the transducer shown here was adapted to enable measurements on a lab-scale concrete beam. It measures 38 cm by 10.5 cm, with a gauge length of 27.5 cm. The first eigenfrequency of this transducer was simulated to be 244 Hz, which is well above the typical resonance frequencies of civil structures such as long pre-stressed concrete bridges. The transducer is made of aluminum because this material features a relatively high strength-to-weight ratio, is resistant to corrosion and can be straightforwardly mechanically machined. In the present example, the transducers are produced by means of laser cutting.

The actual fiber Bragg grating sensor (FBG sensor) is not directly attached to the surface of the transducer, but fiber portions at both sides of the FBG are glued with a two-component adhesive (X60 from HBM) into grooves fabricated with a milling machine. They have a depth of 0.3 mm, a width of 1.5 mm and a length of 31 mm. Before installation of the FBG, the grooves were cleaned with isopropanol. The transducer depicted here has four grooves to allow installing an additional reference FBG sensor that measures the actual strain applied to the transducer. The transducer is equipped with two holes that allow attaching the system to the concrete beam, or any other structure. The strain amplification A is then defined as $$A = \frac{\varepsilon_f}{\varepsilon_t} = \frac{\Delta L_f / L_f}{\Delta L_t / L_t}$$

where $L_f$ is the distance over which the FBG measures the amplified strain, and $L_t$ is the distance over which the reference FBG measures the reference strain. A three-dimensional (3D) finite element (FE) model has been built in COMSOL software to determine the displacement on the transducer. A view of a simulation result is shown in FIG. 6. In the simulations the left mounting hole was fixed and a tensile force of 300 N was applied to the right mounting hole in the x-direction. The resulting displacement shows to be the largest in the central section.

Figure 11:
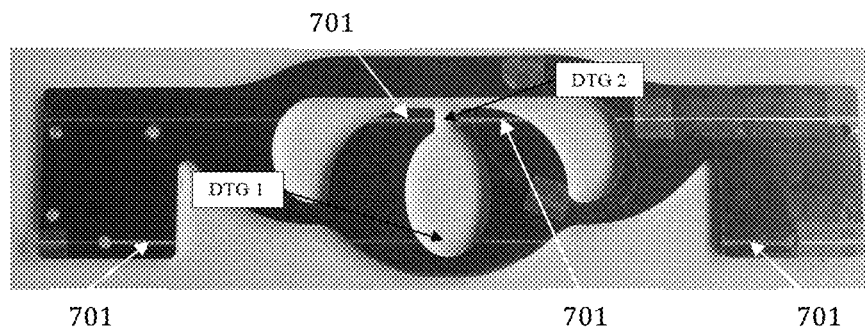
FIG. 11 indicates the location of the DTGs on the strain-amplifying transducer, according to an embodiment of the present invention. The reference fiber Bragg grating was mounted at an alternative location with respect to the grooves illustrated in FIG. 5. These gratings were surface mounted with X60 adhesive from HBM.

A number of experimental results were obtained with the device shown in FIG. 5. For the experiments, ORMOCER® coated Draw Tower Gratings (DTG®) were used as FBG sensors, with a coating diameter of 195 μm. The length of the DTGs is 8 mm and the reflectivity is above 15%. DTGs feature a high mechanical strength, which is desirable since the central grating is exposed to amplified strain levels. A first DTG is installed with fixation points on the mounting brackets in order to provide a measure for the total strain applied to the transducer. A second DTG is installed in the region with amplified strain. The portions 701 indicated in FIG. 11 indicate the regions were the adhesive is applied in the corresponding grooves.

To calibrate the transducers, tensile tests were carried out on a Schenck Trebel test bench. The applied axial load was increased from 0N to 100N at constant displacement speed (0.2 mm/min) and the load/unload cycle was repeated three times. Four transducers were characterized to investigate the repeatability of the manufacturing. The temperature during the measurements was sufficiently stable to allow neglecting temperature variations. The DTG reflection spectra and the shift of the Bragg wavelengths were monitored using a Micron Optics SM125-500 interrogator with a wavelength accuracy of 1 pm at 2 Hz.

Figure 12A:
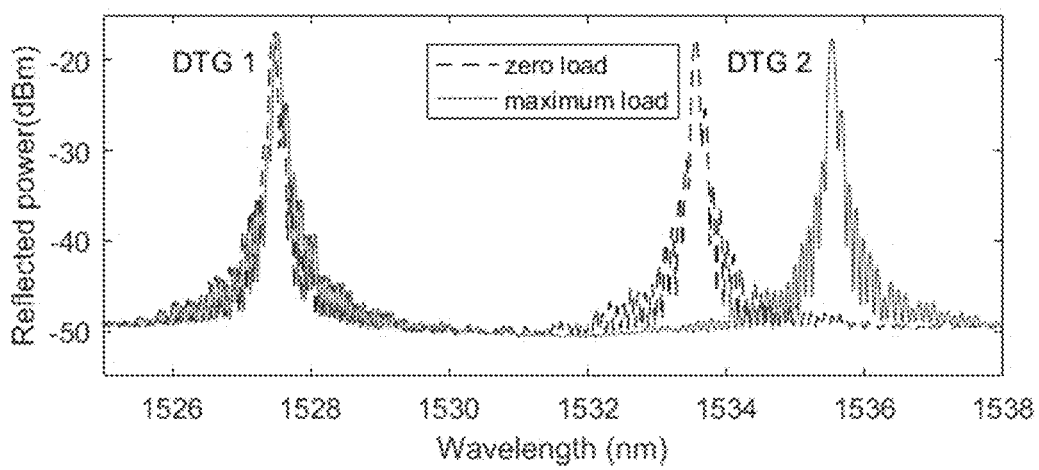
FIG. 12a illustrates the reflected power spectrum of the DTGs on the strain-amplifying transducer under zero and maximum load, as can be obtained using an embodiment of the present invention as illustrated in FIG. 11.
Figure 12B:
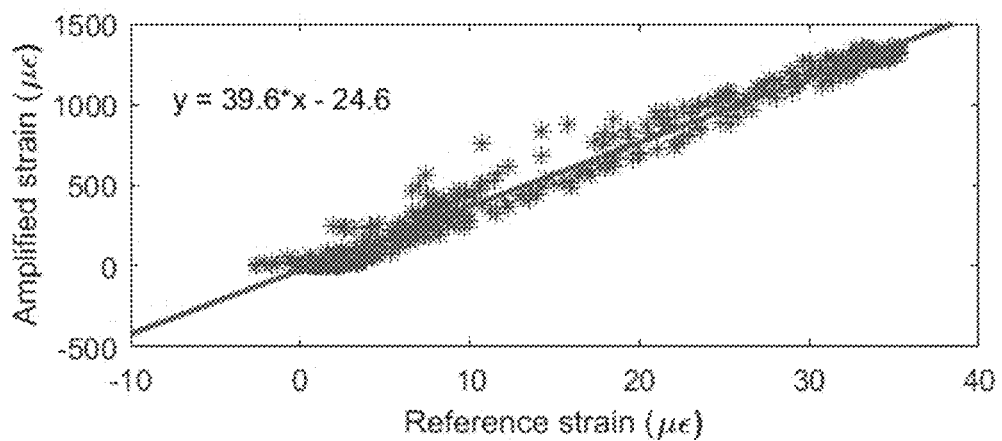
FIG. 12b illustrates the strain amplification derived as the slope of the linear fit of amplified strain versus reference strain, as can be obtained using an embodiment of the present invention as illustrated in FIG. 11.

FIG. 12a shows the reflection spectrum of DTG1 and DTG2 when a transducer is unloaded and when loaded with a 100N tensile force. DTG 1 represents the grating that measures the total strain applied to the transducer and DTG 2 represents the grating that measures amplified strain (see also FIG. 11). FIG. 12b shows the relation between the strain measured by both DTGs during the 3 load/unload cycles. The slope of the linear fit of these data points gives an experimental value for the strain amplification A. Four transducers were tested and strain amplification factors of 33, 34.5, 39.6 and 36.7 were found, with a Pearson Correlation Coefficient for the linear regression of 0.996, 0.987, 0.991 and 0.996, respectively. The variation between these results can be caused by small differences in the dimensions of the grooves or by differences in the amount of adhesive used to attach the sensors.

The above illustrates a strain transducer for strain measurements with fiber Bragg gratings. The average experimentally derived strain amplification is 36, and the first eigenfrequency is 244 Hz, allowing the transducer to be used for accurate dynamic strain monitoring of civil structures in operational conditions. An array of wavelength-multiplexed FBG sensors installed with this dedicated transducer therefore could overcome some of the challenges encountered in sensor systems for vibration-based damage identification.

Figure 13:
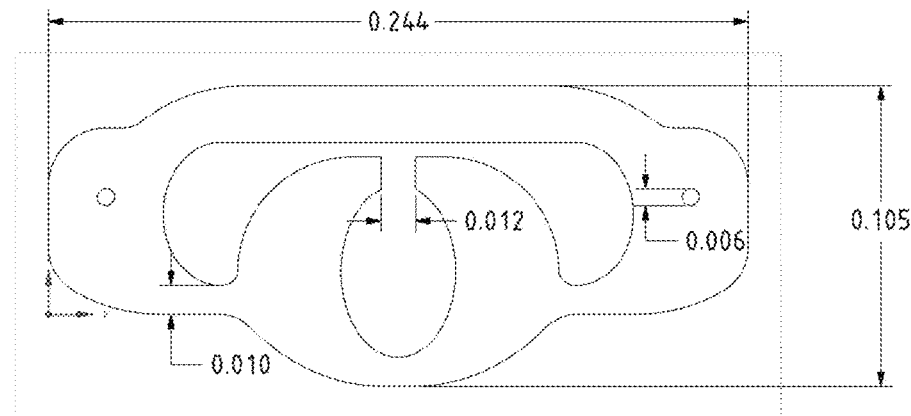
FIG. 13 to FIG. 14 illustrates three exemplary transducers according to embodiments of the present invention.
Figure 14:
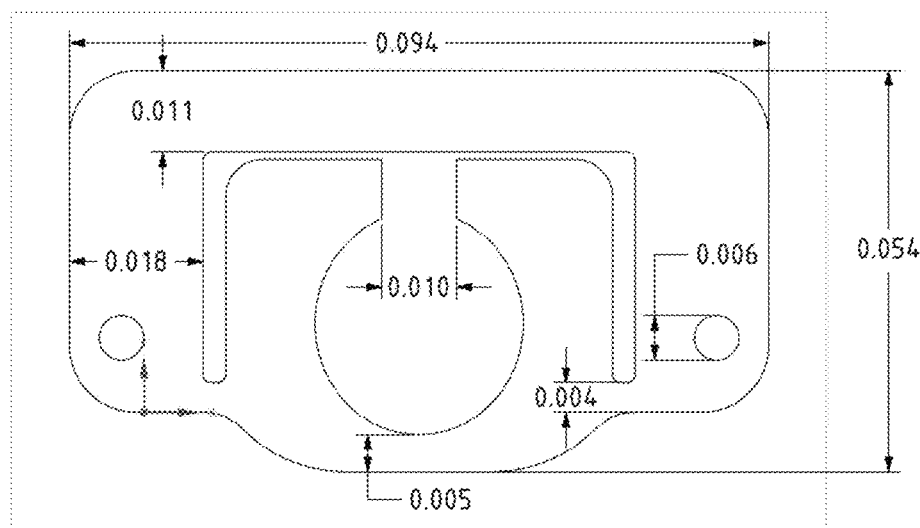

Further by way of illustration, some exemplary transducers are illustrated in FIG. 13 to FIG. 14. Although particular dimensions are illustrated in these examples, it will be clear to the skilled person that embodiments are not restricted to these particular dimensions but that these dimensions are illustrative for dimensions resulting in transducers with a good strain amplification.

Figure 15:
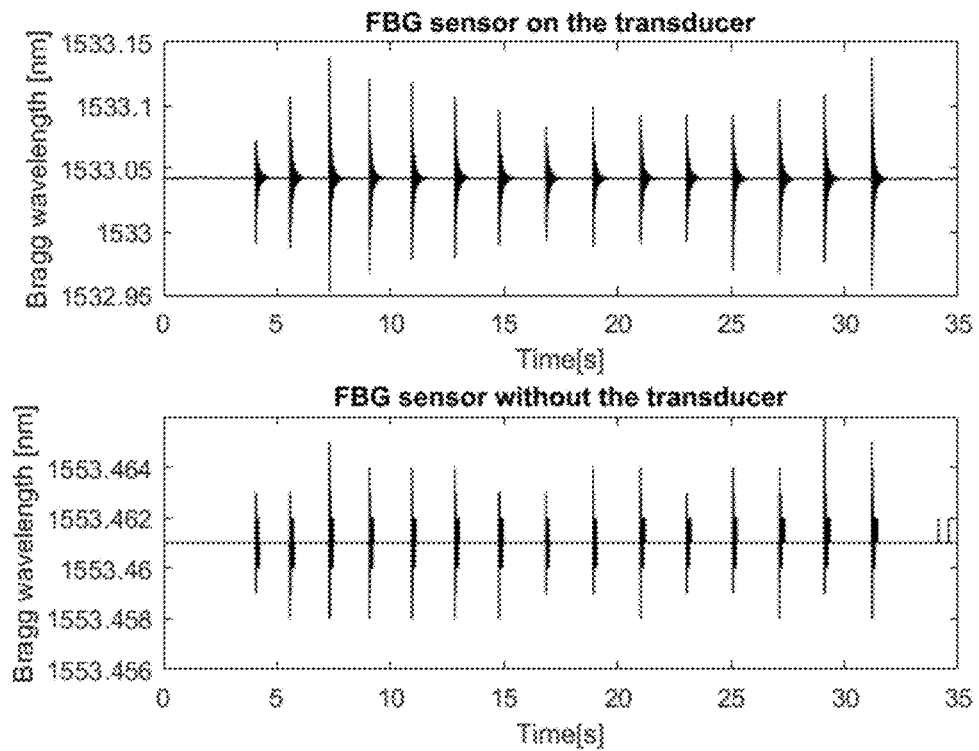
FIG. 15 illustrates a dynamic strain measurement on a concrete beam using a transducer according to an embodiment of the present invention (upper graph) and a conventional FBG sensor (lower graph).

Further by way of illustration, an example of dynamic strain measurements is shown on a concrete beam, under hammer impacts. The results shown in FIG. 15 illustrate hammer impacts comparing measurements with a mechanical strain amplifying transducer according to an embodiment of the present invention and measurements obtained with a conventional FBG sensor, measured at an equivalent position on the concrete beam. It can be seen that the strain measurements obtained with the transducer are substantially more detailed than those obtained with the FBG sensor.

By way or illustration, embodiments of the present invention not being limited thereto, experimental results are discussed below, in the frame work of a system allowing to measure very low strains. The system is based on a FBG sensor with a dedicated mechanical transducer that mechanically amplifies the strain applied to a FBG sensor compared to that applied to the transducer itself. The results were obtained in the framework of detecting and locating damage on concrete bridges (note that 86% of the bridges in Europe are made of concrete), although embodiments are not limited thereto. The system should allow not only for static, but also for dynamic strain measurements. Furthermore, following advantages are obtained with at least some embodiments of the present invention.

The average strain advantageously is measured over a sufficient length to allow for integrating the spatial strain variations inherent to the inhomogeneous nature of concrete. On the other hand, the gauge length advantageously is not too large such that multiple transducers can be mounted to enable quasidistributed measurements over the entire concrete structure.

The transducer's eigenfrequencies advantageously is sufficiently high to avoid interference with the typical resonance frequencies of civil structures such as long prestressed concrete bridges.

The lowest eigenfrequency advantageously exceeds 50 Hz.

The stiffness of the transducer advantageously is negligible when compared to the local stiffness of the civil structure in the region where it is mounted. The spring constant advantageously is lower than $10^7$ Nm$^{-1}$.

The transducer advantageously is straightforwardly installable and replaceable, without requiring expert knowledge in the handling of optical fibers and it advantageously is manufacturable at low cost with high repeatability.

Finally and most importantly, the transducer advantageously enables strain measurements in both tension and compression, and advantageously results in strain levels experienced by the FBG sensor at least 10 times larger than those experienced by the structure and hence by the transducer itself, in order to provide for the required measurement resolution.

Figure 16:
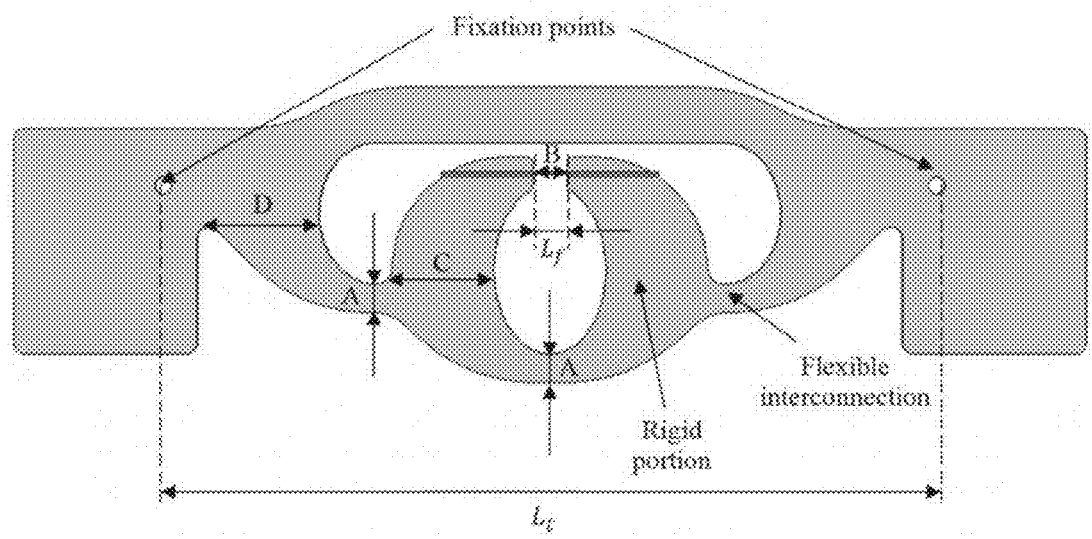
FIG. 16 illustrates a transducer design according to an embodiment of the present invention.
Figure 18:
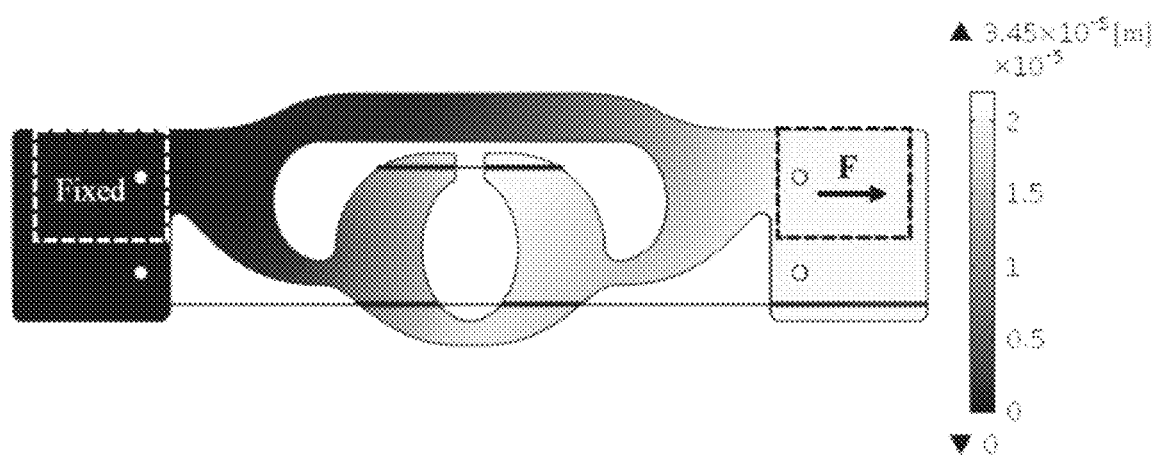
FIG. 18 illustrates simulated results for the total displacement across the strain-amplifying transducer according to an embodiment of the present invention.

The basis of the structural model for the strain amplifying transducer according to the present example is shown in FIG. 16. It features a symmetric double cantilever structure and contains two flexible interconnections between rigid portions. The pre-defined spacing between the two rigid portions allows for easy installation of an optical fiber holding a FBG. Two fixation points also enable bolting the transducer to a concrete structure. The transducer comprises a symmetric double cantilever structure in which the relatively large cantilever widths (indicated with parameters C and D) provide for rigid sections that can rotate about the more flexible regions (indicated with parameter A) that interconnect the cantilevers. Owing to the relative positions of the hinges with respect to the cantilevers a strain applied to the fixation points results in a relative displacement at the spacing in the central section (with width B) that is larger than the strain applied to the transducer itself. The strain measured by an FBG installed between the two ends of this central section can then quantify that relative displacement. In order to illustrate this mechanism, the total displacement across the strain-amplifying transducer when loaded in the horizontal direction is shown in FIG. 18. As already stated, the gauge length should be sufficiently small to allow for quasi-distributed measurements, whilst remaining sufficiently long to integrate the spatial strain variations inherent to the inhomogeneous nature of concrete. The size of the transducer shown here was adapted to enable such measurements on a lab-scale concrete beam. The dimensions are 380 mm×105 mm, with a gauge length LT of 275 mm. The first eigenfrequency of this transducer was numerically simulated to be 244 Hz, which is well above the typical resonance frequencies of civil structures such as long prestressed concrete bridges. This transducer therefore already meets several of the advantages listed above. To mount the FBG, fiber portions were glued at both sides of the FBG using a two-component adhesive into v-grooves fabricated using a standard milling machine. In the design, the transducer consists of two mounting brackets which allow for calibration in a tensile machine.

Figure 17:
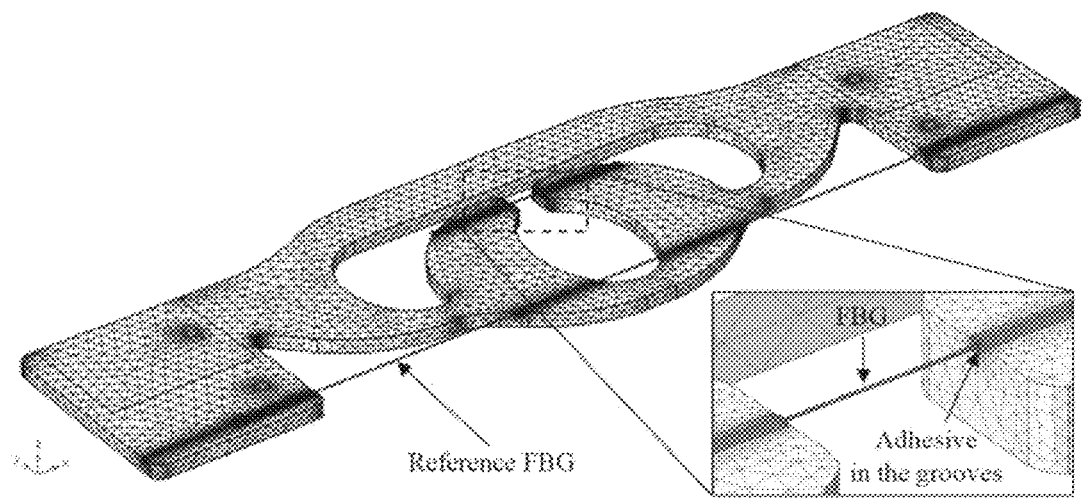
FIG. 17 illustrates a three-dimensional finite element model as used in an experiment illustrating advantages of embodiments of the present invention.

To optimize the design of the transducer a three-dimensional (3D) FE model in COMSOL® was built. The model takes into account the material of the transducer, the glass optical fiber (the diameter of the cladding and the polymer coating of the fiber are 125 µm and 195 µm, respectively) and the adhesive applied to fix the fiber in the v-grooves. The simulations also consider a reference fiber attached to the surface of the brackets which allows measuring the strain applied to the transducer itself (as shown in FIG. 17).

The mesh contains a total of 537 638 elements (tetrahedral, pyramid and hexahedral). Refined meshes are also generated at the location of the optical fiber and the adhesive, featuring in total 382 096 elements. The material parameters used in the 3D FE analysis are listed in the table below.

| Component | Young modules (GPa) | Poisson ration (—) |
| --- | --- | --- |
| Silica fiber | 74 | 0.3 |
| Fiber coating | 1.5 | 0.3 |
| Adhesive | 13 | 0.35 |
| Aluminum | 70 | 0.33 |

Note that the material for the transducer was chosen following simulations with different values of the Young modulus corresponding to different materials. The achievable strain amplification of the transducer tends to converge when the Young modulus of the material of which it is made exceeds 50 GPa. The transducer was eventually made in commercially available plates made from an aluminum-based alloy (AlMg3) owing to the relatively high strength-to-weight ratio, low cost and resistance to corrosion of this material. The boundary conditions in these simulations were defined as follows. One side of the transducer was fixed over an area covering most of the left mounting bracket and a tensile force of 100 N (indicated with F in FIG. 18) along the x-direction was applied to the right mounting bracket. This value is equivalent to the load applied in the tensile test that will be discussed below. The resulting strain amplification A was calculated by dividing the strain experienced by the FBG in the central section $L_f$ by the strain experienced by the reference FBG $L_T$. The total displacement throughout the transducer under load is illustrated by means of a gray-scale in FIG. 18. A force applied to the mounting brackets results in a relative displacement at the spacing in the central section that is larger than the relative displacement applied to the transducer itself.

The key dimensions A, B, C and D of the transducer (see FIG. 16) were optimized using the COMSOL® FE model in order to achieve the highest strain amplification given the outer dimensions of 380×105 mm of the transducer. One of the criteria used for the optimization was that flexible interconnections can not to be too narrow (below 7 mm) to avoid in-plane and out-of-plane bending. Parameter B should not be smaller than 8 mm to allow for sufficient space for installing the FBG sensor. The key dimensions were optimized by varying their value in steps of 1 mm in the following ranges: 7-10 mm for A, 8-12 mm for B and in steps of 10 mm: 50-70 mm for C and 57-77 mm for D. The value of strain amplification after optimization was 31.9. The effect of the transducer's thickness was also considered in the range from 3 to 9 mm every 2 mm. For each value the spring constant and the lowest eigenfrequency were calculated.

To do so one side of the transducer was fixed whilst loading the other side along the +x direction with a total force of 100 N. The elongation between the fixation points was used to calculate the value of the spring constant as shown in the table below

| Thickness (mm) | Spring constant ($10^6$ N m$^{-1}$) | Strain amplification (—) | First eigenfrequency (Hz) |
| --- | --- | --- | --- |
| 3 | 2.9 | 29.8 | 148 |
| 5 | 4.6 | 31.9 | 244 |
| 7 | 6.3 | 30.8 | 338 |
| 9 | 8.0 | 31.2 | 409 |

Each of the simulated transducers with different thicknesses has a spring constant below $10^7$ Nm$^{-1}$ and a first eigenfrequency above 50 Hz. The transducers were eventually manufactured with a thickness of 5 mm as this provides the highest strain amplification.

Four transducers were manufactured according to the design described in the previous section using laser cutting. The grooves were made with a standard milling machine. The depth and the width of the grooves are 0.3 mm and 1.5 mm, respectively. For the FBG sensors commercially available ORMOCER® coated draw tower gratings (DTG®) were used, with a coating diameter of 195 μm. The length of the DTGs is 8 mm and the reflectivity is above 20%. Before installation of the FBGs, the grooves were cleaned with isopropanol. In some embodiments, roughening the inner surface of the grooves with sandpaper before applying the adhesive could be applied, which could increase the bond strength between the aluminum and the adhesive. After cleaning the grooves, each transducer was equipped with two FBGs, glued in the grooves using X60 adhesive from HBM. To control the amount of adhesive it was applied by means of a syringe with needle. A first grating (DTG1) is installed near the fixation points on the mounting brackets in order to provide a reference measurement of the total strain applied to the transducer. A second grating (DTG2) is installed in the region with amplified strain. Before applying the adhesive, each FBG sensor was pre-strained with ~500 με.

To calibrate the transducers tensile tests were carried out on a Schenck Trebel test bench. The applied axial load was increased from 0 to 100 N at a constant displacement speed (0.2 mm min$^{-1}$) and repeated the load/unload cycle three times. Four transducers were characterized to check on the repeatability of the manufacturing and results.

The reflection spectra and the shift of the Bragg wavelengths were monitored with a Micron Optics SM125-500 interrogator, featuring a Bragg wavelength measurement accuracy of 1 pm at a measurement frequency of 2 Hz. During the tests the temperature was monitored using another FBG sensor. It was found that the temperature was sufficiently stable (±0.15° C.) to allow neglecting the influence of temperature variations.

Figure 19A:
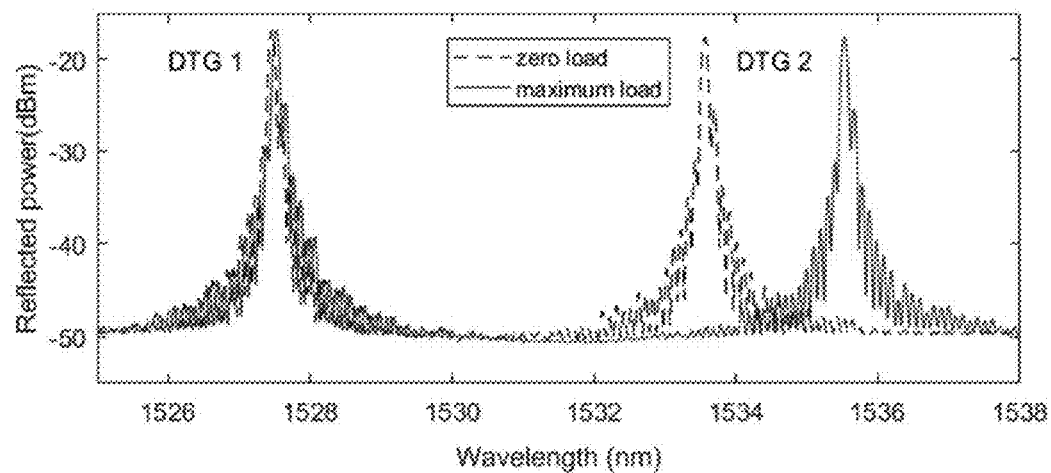
FIG. 19a and FIG. 19b illustrates a reflected power spectrum of the DTG and the corresponding strain amplification as obtained using embodiments of the present invention.

FIG. 19a shows the reflection spectrum of DTG1 and DTG2 in unloaded condition and when loaded with a 100 N tensile force for one of the transducers.

Figure 19B:
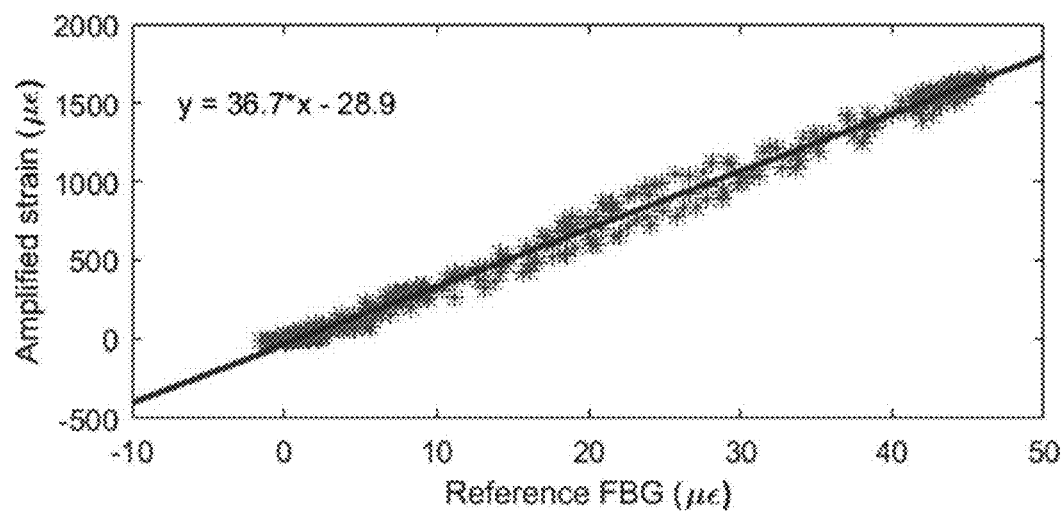

FIG. 19b shows the relation between the strain measured by both DTGs during the three load/unload cycles. To calculate the strain amplification, a weighted linear fit of the recorded amplified strain versus the recorded reference strain was performed. Weights were assigned in the fit that are proportional to the strain amplitude, since low amplitude strain results in a larger relative error than high amplitude strain. The slope of the linear fit of these data points provides the experimental value for the strain amplification A. The four transducers were tested, which yielded strain amplification factors of 33.3, 33.8, 37.7 and 36.7, with a Pearson correlation coefficient for the linear regressions of 0.996, 0.987, 0.991 and 0.996, respectively. The variation between the strain amplification factors essentially stems from small differences in the dimensions of the grooves and from differences in the amount of adhesive used to attach the sensors. The overall volume of applied adhesive is controlled. However, some adhesive appears to leak out of the grooves from the region around the fiber. This could influence the local stiffness of the free-standing fiber and thus affect the overall strain amplification. Nevertheless, the strain amplification values of all the transducers are close to that obtained in the simulation (31.9).

In order to evaluate the operation of our transducer in view of measuring the targeted small-level dynamic strain measurements on concrete structures, an experiment was also conducted on a full-scale pre-stressed concrete beam. The I-shaped beam had a length of 5.0 m and a variable height up to 0.9 m. It rested on a supporting steel table by means of two supports located at 1.0 m from the extremities. For quasi-static loading, the boundary conditions approximated these of a simply supported beam. The four transducers were attached to the bottom of the concrete beam using dedicated mounting supports. These mounting supports were bonded with HBM X60 adhesive to the concrete surface. The transducer was fixed on the mount with an M6 wing nut. Static and dynamic tests were performed. In the static 3-point bending test, a vertical load was applied to the beam at one location in the middle of the beam. The maximum applied force was 100 kN. For the dynamic tests the beam was excited with a hammer during 30 s, such that the hammer impacted the structure from the top at one of its corners.

Figure 20:
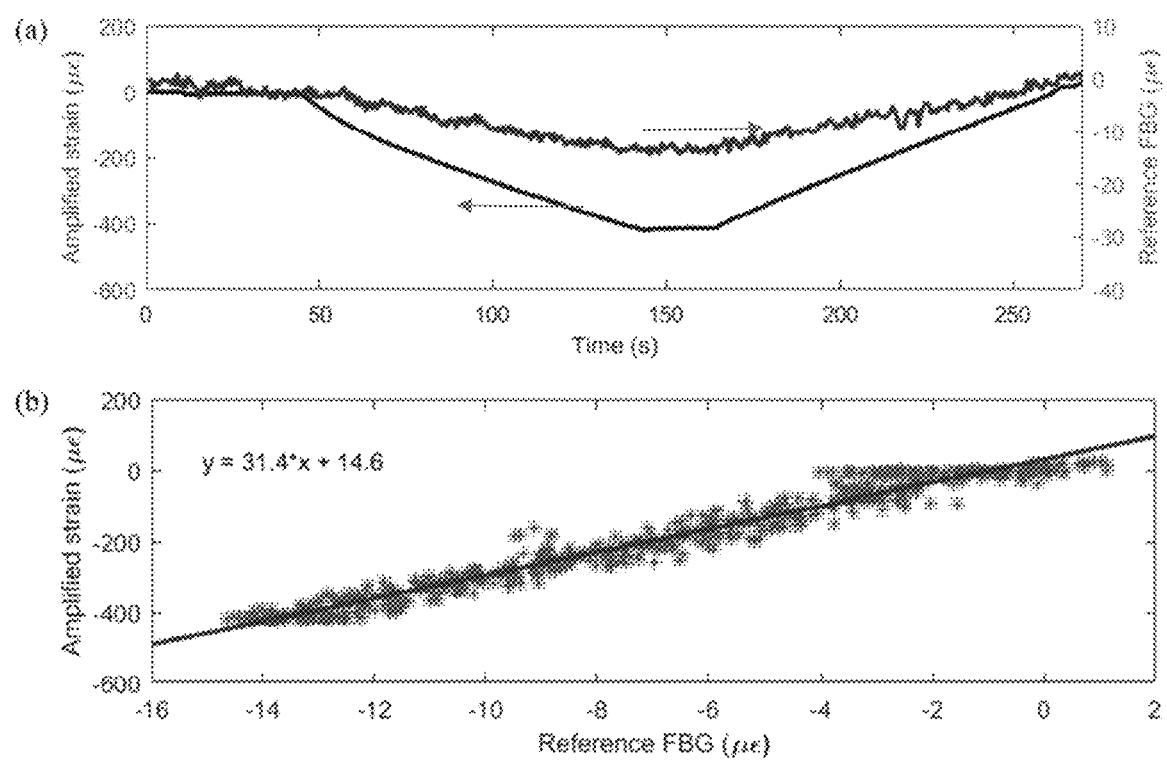
FIG. 20 illustrates the strain measured on a reference FBG and on the FBG experiencing the amplified strain during a static 3-point bending test under maximum load 100 kN (a) and the relation between the strain measured by both DTGs during the static test (b), illustrating features of embodiments of the present invention.

FIG. 20(a) shows strain obtained with a selected transducer during one cycle of increasing and decreasing load during the static test. As expected the strain measured by DTG2 located in the central section of the transducer is significantly larger than that recorded by the reference sensor DTG1. The minimum strain measured by DTG2 was −420 με, whilst that obtained from DTG1 was −13 με. It is also noticeable that the signal obtained on the reference FBG is much more noisy compare to the signal where the strain is amplified. The negative value indicates that the transducer experienced compressive strain. FIG. 20(b) shows the relation between the strain measured by both DTGs during the static test up to a maximum load of 100 kN. To calculate the strain amplification from the static test we used the same weighed linear fit as discussed above. The slope of the linear fit of data points for four transducers result in an experimentally obtained value for the strain amplification of 32.3, 30.3, 33.4 and 31.4, with a Pearson correlation coefficient for the linear regressions of 0.997, 0.978, 0.996 and 0.978, respectively. The experimental results and the numerical results (determined from the FE model) are in good agreement, with a relative error smaller than 5%. This supports the validity of our FE model.

Figure 21:
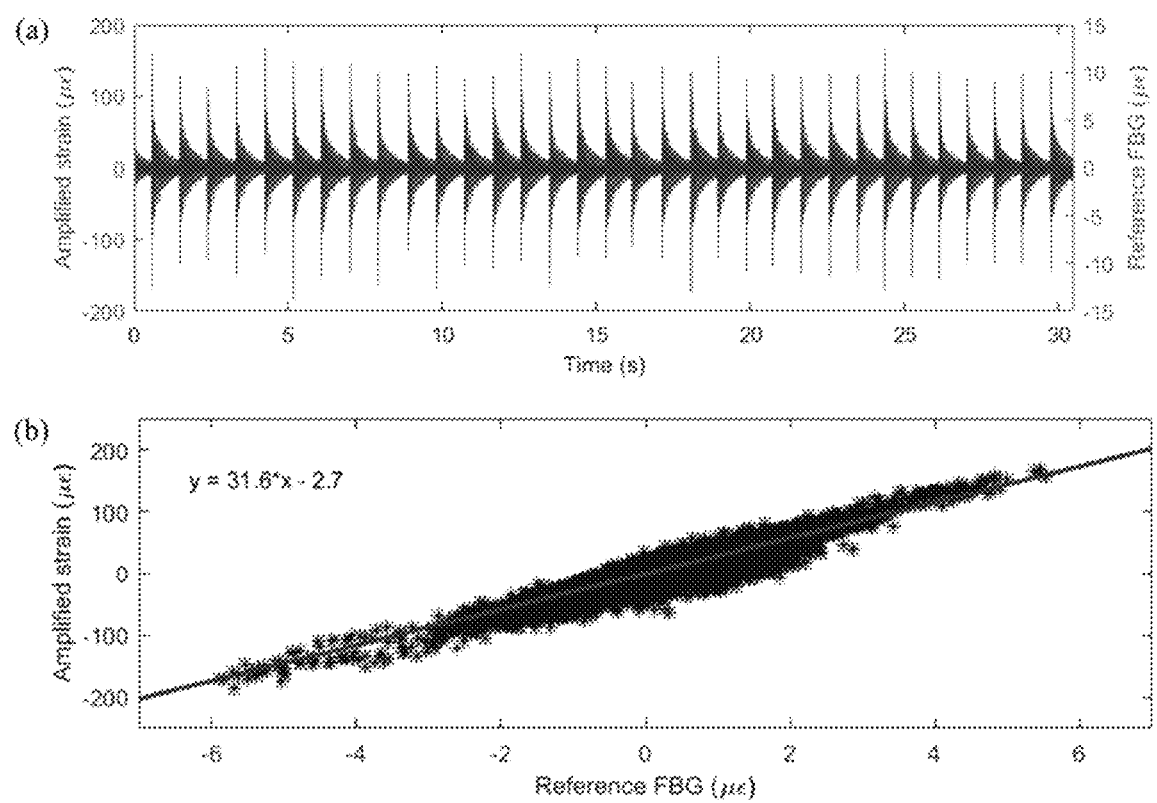
FIG. 21 illustrates the strain measured on a reference FBG and on the FBG experiencing the amplified strain during dynamic tests (a) and the relation between the strain measured by both DTGs during the dynamic test (b), illustrating features of embodiments of the present invention.

FIG. 21 reports measurements obtained from the same selected transducer during the dynamic tests. To analyze the data we first applied a high pass filter to remove low frequency noise resulting from temperature and optical power fluctuations of the light source. The cut-off frequency of the high pass filter was 0.5 Hz. The maximum strain during hammer impacts measured with DTG2 (amplified strain) is close to 140 με, whilst for DTG1 (reference strain) the maximum strain was close to 4 με (FIG. 21(a)). To calculate the strain amplification from the dynamic test we again applied the same weighed linear fit. The strain amplification calculated from the slope of the linear fit of these data points gives a value of 36.9, 34.5 and 31.6, with a Pearson correlation coefficient for the linear regressions of 0.966, 0.927 and 0.906 for the transducer 2, 3, 4, respectively. For transducer 1 the signal from the reference FBG was not recorded, but the measured strain from the amplified strain FBG was close to 140 με, i.e. similar to that obtained with the other transducers.

The values of strain amplification calculated from the dynamic tests are higher comparing with the static tests what can be caused by a change in the boundary conditions during these two experiments.

The invention claimed is:

1. A transducer for assisting in measuring displacement or strain in an object of interest, the transducer being a plate having at least two end sections for mounting the transducer to the object of interest,
   the transducer comprising a flexible connection between the two end sections, the flexible connection comprising a plurality of rigid portions and flexible interconnections between the rigid portions for allowing relative movement of the rigid portions with respect to each other, the flexible connection having a central section being substantially U-shaped comprising two rigid portions spaced from each other over a distance and adapted for positioning a strain sensing element at the spacing in between said two rigid portions, the central section being connected to the remainder of the flexible connection via flexible interconnections,
   wherein the rigid portions and flexible interconnections are arranged so that a first relative displacement applied to the end sections results in a second relative displacement at the spacing in the central section, the second relative displacement being larger than the first relative displacement applied to the end sections,
   wherein the central section is connected to the remainder of the flexible connection via flexible interconnections at a position along the upstanding legs of the U-shape, on the rigid portions, away from a position of the spacing adapted for positioning a strain sensing element along the upstanding legs of the U-shape.

2. The transducer according to claim 1 wherein the transducer is configured for inducing a strain amplification in a same direction as a direction wherein a force is applied to the transducer.

3. The transducer according to claim 1, wherein the plurality of rigid portions and flexible interconnections form more than 1 lever.

4. The transducer according to claim 1, wherein the central section is connected to the remainder of the flexible connection via flexible interconnections at a position on the rigid portions away from a top side of the substantial U-shape being the opening of the U-shape.

5. The transducer according to claim 1, wherein the central section is connected to the remainder of the flexible connection via flexible interconnections positioned at an intermediate position along the upstanding legs of the U-shape.

6. The transducer according to claim 1, wherein the transducer plate is made of a single material.

7. The transducer according to claim 1, wherein the plate has a uniform thickness.

8. The transducer according to claim 1, wherein the ratio of the distance between the mounting points to the spacing between the spaced rigid portions of the central section is at least 2.

9. The transducer according to claim 1, wherein the plate has a single symmetry axis or has two symmetry axes.

10. The transducer according to claim 1, wherein the distance between the mounting points is at least 5 cm.

11. The transducer according to claim 1, in which the eigenfrequencies of the structure are above 50 Hz.

12. The transducer according to claim 1 in which the thickness of the structure is between 1-10 mm.

13. The transducer according to claim 1, in which the spring constant of the plate is below 107 N/m.

14. The transducer according to claim 1, in which grooves are provided on the surface of the plate to mount the strain element at the central section.

15. The transducer according to claim 1, wherein the transducer further comprises at least one rigid connection between the two end sections.

16. A system for measuring displacement or strain in an object of interest, the system comprising a transducer according to claim 1 and a strain element connected to the central section and provided with a strain sensor for measuring strain in the central section.

17. The system according to claim 16, wherein the strain experienced by the strain sensor is amplified by the transducer with respect to the strain applied to the end sections of the plate, whereby the strain amplification is larger than 5.

18. The system according to claim 16, wherein strain element is mounted under pre-strain and/or wherein the strain element comprises one or more of an optical fiber, a strain gauge or a fiber Bragg grating.

* * * * *